US009142063B2

(12) United States Patent
Chen et al.

(10) Patent No.: US 9,142,063 B2
(45) Date of Patent: Sep. 22, 2015

(54) POSITIONING SYSTEM UTILIZING ENHANCED PERCEPTION-BASED LOCALIZATION (71) Applicant: Caterpillar Inc., Peoria, IL (US)

(72) Inventors: Qi Chen, Dunlap, IL (US); Michael D. Braunstein, Washington, IL (US); Satish Yadav, Peoria, IL (US); Eric Alan Reiners, Washington, IL (US); Kenneth Lee Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 105 days.

(21) Appl. No.: 13/768,471

(22) Filed: Feb. 15, 2013

(65) Prior Publication Data
US 2014/0236477 A1  Aug. 21, 2014

(51) Int. Cl.
*G07C 5/00* (2006.01)
*G01S 1/24* (2006.01)
*G01S 13/86* (2006.01)
*G05D 1/02* (2006.01)
*G08G 1/16* (2006.01)
*G01S 13/93* (2006.01)
*G07C 5/08* (2006.01)

(52) U.S. Cl.
CPC .............. *G07C 5/008* (2013.01); *G01S 13/865* (2013.01); *G01S 13/867* (2013.01); *G05D 1/024* (2013.01); *G05D 1/0246* (2013.01); *G05D 1/0257* (2013.01); *G05D 1/0278* (2013.01); *B60W 2300/17* (2013.01); *G01S 2013/9332* (2013.01); *G05D 2201/02* (2013.01); *G05D 2201/021* (2013.01); *G05D 2201/0202* (2013.01); *G07C 5/085* (2013.01); *G08G 1/16* (2013.01)

(58) Field of Classification Search
CPC ... G05D 1/024; G05D 1/0257; G05D 1/0278; G05D 1/0246; G05D 2201/0202; G05D 2201/021; G05D 2201/02; B60W 2300/17; G01S 13/865; G01S 13/867; G01S 2013/9332; G08G 1/16; G07C 5/008; G07C 5/085
USPC ........... 701/50, 408, 409, 445, 450, 457, 461, 701/468, 469, 479, 480, 482, 532; 340/995.1, 995.14, 995.25; 345/629, 345/632, 633
See application file for complete search history.

(56) References Cited

U.S. PATENT DOCUMENTS

| 5,259,037 A | * | 11/1993 | Plunk ............................ 382/154 |
| 5,467,284 A | | 11/1995 | Yoshioka et al. |
| 5,745,126 A | * | 4/1998 | Jain et al. ...................... 382/154 |
| 6,064,926 A | | 5/2000 | Sarangapani et al. |

(Continued)

FOREIGN PATENT DOCUMENTS

GB        2475197 A     5/2011

*Primary Examiner* — Russell Frejd
(74) *Attorney, Agent, or Firm* — Finnegan, Henderson, Farabow, Garrett & Dunner, LLP (57) ABSTRACT A positioning system and method for determining a position of a machine on a worksite are disclosed. The method may store a map of the worksite which includes one or more known objects in the worksite. The method may determine whether a locating device associated with the machine is accurately providing the position of the machine. The method may also include detecting one or more objects in the worksite. The method may further determine an unmatched object from among the detected objects that does not match the one or more known objects stored in the map. The method may also store the unmatched object in the map as a known object of the worksite.

16 Claims, 4 Drawing Sheets

(56) References Cited

U.S. PATENT DOCUMENTS

| | | | |
|---|---|---|---|
| 6,167,336 A * | 12/2000 | Singh et al. .................... 701/50 |
| 6,539,294 B1 | 3/2003 | Kageyama |
| 7,239,339 B2 * | 7/2007 | Nagai et al. .................. 348/116 |
| 7,731,450 B2 * | 6/2010 | Congdon et al. ............. 404/84.5 |
| 8,036,771 B2 | 10/2011 | Hayashi |
| 8,234,010 B2 * | 7/2012 | Thompson et al. ........... 700/258 |
| 8,280,621 B2 * | 10/2012 | Edwards et al. ............. 701/301 |
| 2009/0177389 A1 | 7/2009 | Wu |
| 2009/0259399 A1 | 10/2009 | Kotejoshyer et al. |
| 2010/0026555 A1 | 2/2010 | Whittaker et al. |
| 2010/0094499 A1 * | 4/2010 | Anderson ...................... 701/23 |
| 2011/0029903 A1 * | 2/2011 | Schooleman et al. ........ 715/764 |
| 2012/0083982 A1 * | 4/2012 | Bonefas et al. ................ 701/70 |
| 2012/0095651 A1 * | 4/2012 | Anderson ...................... 701/50 |
| 2012/0283906 A1 * | 11/2012 | Anderson ...................... 701/25 |
| 2013/0027559 A1 * | 1/2013 | Edwards et al. ............. 348/148 |
| 2013/0034269 A1 * | 2/2013 | Kiyota ......................... 382/103 |

* cited by examiner

POSITIONING SYSTEM UTILIZING ENHANCED PERCEPTION-BASED LOCALIZATION

TECHNICAL FIELD

The present disclosure relates generally to a machine positioning system and, more particularly, to a machine positioning system utilizing enhanced perception-based localization.

BACKGROUND

Machines such as, for example, dozers, motor graders, wheel loaders, wheel tractor scrapers, and other types of heavy equipment are used to perform a variety of tasks at a worksite. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. The position, velocity, and/or distance traveled by the machine are parameters, the accuracy of which may be important for control of the machine and its operation.

Conventional machines typically utilize a navigation or position system to determine various operating parameters, such as position, velocity, pitch rate, yaw rate, and/or roll rate for the machine. Some conventional machines utilize a combination of one or more Global Positioning System (GPS) data, a Distance Measurement Instrument (DMI) and/or odometer measurement data, and/or Inertial Measurement Unit (IMU) data to determine these parameters. Some machines utilize radar sensors, sonar sensors, LIDAR sensors, IR and non-IR cameras, and similar sensors to help guide the machines safely and efficiently in the worksite. In various worksite conditions, different measuring and sensing devices work better than others. Machines utilize combinations of data from these different types of measuring and sensing devices in an attempt to produce robust positioning systems that work in various worksite conditions.

An exemplary system that may be utilized to determine the position of a machine is disclosed in co-pending U.S. patent application Ser. No. 13/721,958 to Friend et al. ("the '958 application"). The system of the '958 application utilizes a perception sensor, such as a LIDAR sensor, to obtain a first estimated position of the machine based on scene data obtained by the perception sensor. The system obtains the first estimated position using a perception-based localization method. The system also obtains a second estimated position of the machine based on a location signal, such as a GPS signal. Based on a comparison of the first estimated position and the second estimated position, the system may estimate the position of the machine.

The positioning system of the present disclosure provides for enhancements to the perception-based localization method of the '958 application, such that the disclosed positioning system may be utilized in additional worksite conditions.

SUMMARY

In one aspect, the present disclosure is directed to a method for determining a position of a machine on a worksite. The method may include storing a map of the worksite which includes one or more known objects in the worksite. The method may include determining, by a processor, whether a locating device associated with the machine is accurately providing the position of the machine. The method may also include detecting one or more objects in the worksite. The method may further include determining, by the processor, an unmatched object from among the detected objects that does not match the one or more known objects stored in the map. The method may also include storing the unmatched object in the map as a known object of the worksite, responsive to determining that the locating device is accurately providing the position of the machine.

In another aspect, the present disclosure is directed to a position determination control system for determining a position of a machine on a worksite. The system may include one or more memories storing instructions and a map of the worksite which includes one or more known objects in the worksite. The system may include one or more processors configured to execute the instructions to perform operations. For example, the one or more processors may determine whether a locating device associated with the machine is accurately providing the position of the machine. The one or more processors may also detect one or more objects in the worksite. The one or more processors may also determine an unmatched object from among the detected objects that does not match the one or more known objects. Further, the one or more processors may store the unmatched object in the map as a known object of the worksite, responsive to determining that the locating device is accurately providing the position of the machine.

In yet another aspect, the present disclosure is directed to a system for determining a position of a machine on a worksite. The system may include one or more memory storage devices for storing a map of the worksite comprising one or more known objects in the worksite and positions of the one or more known objects. The system may include a GPS device associated with the machine, and a movement sensor associated with the machine for detecting one or more movements of the machine. The system may also include an object detection sensor associated with the machine for detecting one or more objects in the worksite. Further, the system may include a controller in communication with the one or more memory storage devices, the GPS device, the movement sensor, and the object detection sensor. The controller may be configured to determine whether the GPS device is accurately providing the position of the machine. The controller may be further configured to determine an unmatched object from among the detected one or more objects that does not match the one or more known objects stored in the map, and store the unmatched object in the map as a known object of the worksite.

DETAILED DESCRIPTION

Figure 1:
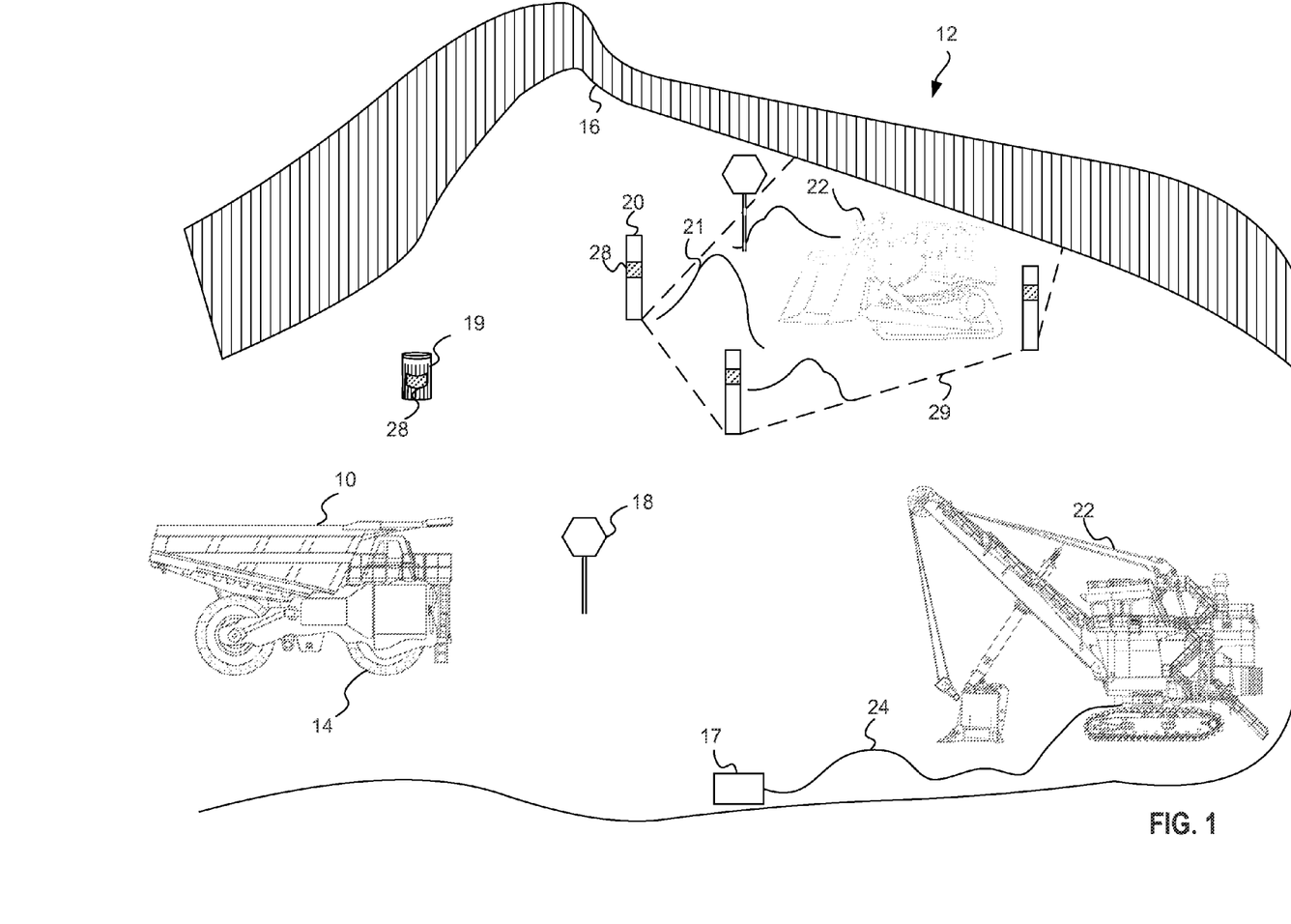
FIG. 1 is a pictorial illustration of an exemplary disclosed machine on a worksite.

FIG. 1 illustrates an exemplary machine 10. Machine 10 may be a mobile machine that performs one or more operations associated with an industry, such as mining, construction, farming, transportation, or any other industry, at a worksite 12. For example, machine 10 may be a load-moving machine, such as a haul truck, a loader, an excavator, or a scraper. Machine 10 may be manually controlled, semi-autonomously controlled, or fully-autonomously controlled. Machine 10 may generally include a power source (not shown), at least one traction device 14, and a positioning system 30 (shown in FIGS. 2 and 3). The power source may be connected to traction device 14, e.g., by a drivetrain, thereby driving traction device 14 to propel machine 10. Traction device 14 may include wheels located on each side of machine 10. Alternatively, traction device 14 may include tracks, belts, or other known traction devices.

Worksite 12 may be a mine site or any other type of worksite traversable by machine 10. In some embodiments, worksite 12 may include various objects. Objects may be any physical thing present in the worksite and/or features of the worksite. For example, worksite 12 may include objects such as side wall 16, equipment 17 such as electricity generators, one or more berms, stationary objects installed by machines and/or humans, such as signs 18, barrels 19, posts 20, and any other objects 21, such as a mound of dirt that may have been created by a machine at worksite 12. Worksite 12 may also include other machines 22 that are mobile about worksite 12, such as the bulldozer shown in FIG. 1. Other machines 22 may also be equipped with positioning system 30 (shown in FIGS. 2 and 3). Some of other machines 22 may have an electric power cable 24 associated with the machine which runs along the floor of worksite 12 to a generator. Such other machines 22 may include electric shovels as shown in FIG. 1, electric drills, and any other machine 22 that uses power cable 24. Any of the objects on worksite 12 may be provided with a marker 28, which may include, for example, reflective tape. Marker 28 may be utilized by machine 10 to detect objects on worksite 12. In various embodiments, worksite 12 may have specific areas 29 that are specifically designated for reasons further discussed in the industrial applicability section below.

While machines at worksite 12 may include functionality to receive GPS signals, various objects on worksite 12 may interfere with the GPS signals, causing GPS reception to be limited or nonexistent in certain areas of worksite 12. For example, a machine in a particular area of worksite 12 may be unable to receive GPS signals and/or may receive only weak GPS signals due to a relatively high side wall 16 that obstructs the line-of-sight between the area and GPS satellites and/or introducing multi-path errors of the GPS signals.

Figure 2:
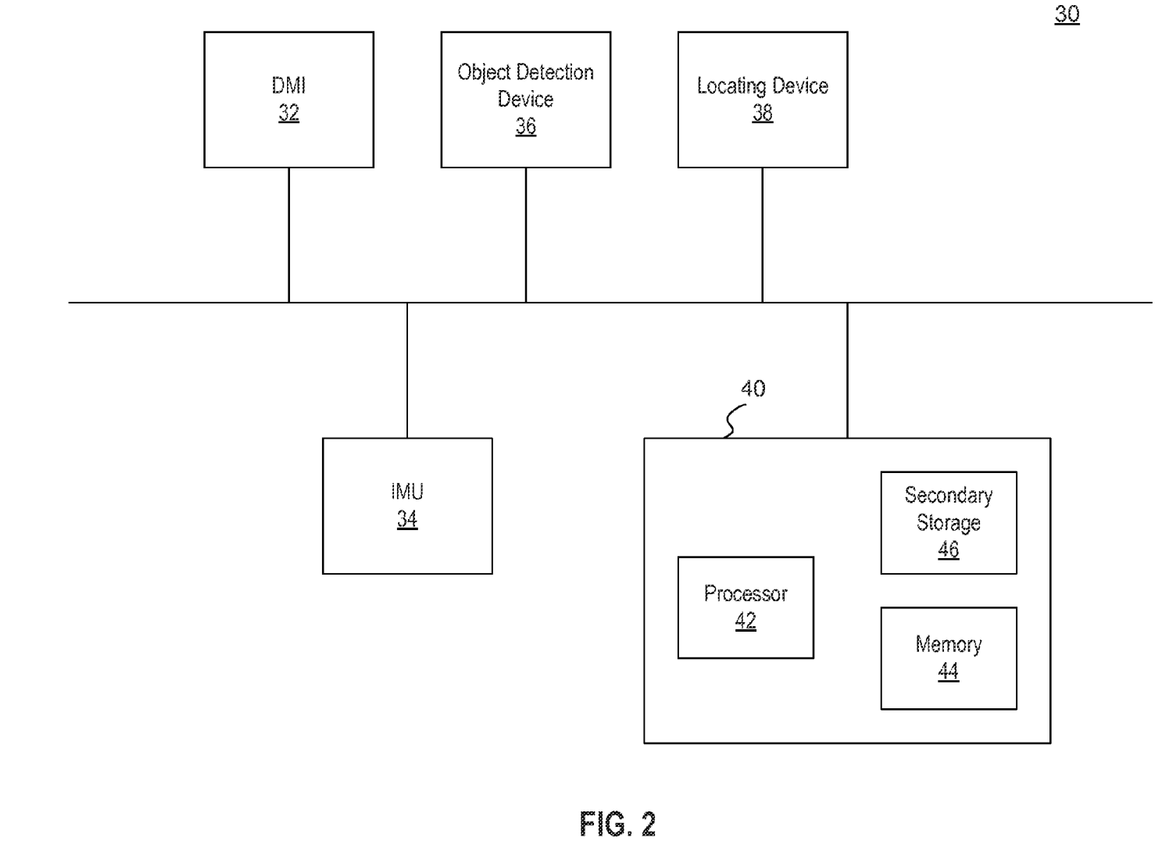
FIG. 2 is a block diagram of an exemplary disclosed positioning system that may be used in conjunction in conjunction with the machine of FIG. 1.

FIG. 2 illustrates an exemplary embodiment of positioning system 30 for positioning machine 10 within worksite 12. Positioning system 30 may include a distance measurement instrument (DMI) 32, an inertial measurement unit (IMU) 34, an object detection device 36, a locating device 38, and a controller 40. Components of positioning system 30 may be connected to each other via any combination of a bus, a wired network, and/or a wireless network. Additionally, such networks may be integrated into any local area network, wide area network, and/or the Internet.

DMI 32 may include one or more devices to provide a signal indicative of a distance traveled by machine 10. For example, DMI 32 may include an odometer to determine the distance traveled by machine 10 by measuring a number of rotations of traction device 14. Alternatively, the odometer may determine the distance traveled by machine 10 by measuring a number of rotations of a member of the drivetrain that connects the power source of machine 10 to traction device 14. For example, the odometer may measure a number of rotations of an axle of traction device 14. In other embodiments, DMI 32 may include a speedometer, which may include a magnetic pickup-type sensor, for example, to determine a travel speed of machine 10. In such embodiments, DMI 32 may determine the distance traveled by machine 10 by integrating the speed of machine 10.

IMU 34 may include one or more devices that provide angular rates and/or acceleration of machine 10. For example, IMU 34 may include a 6-degree of freedom IMU, which includes a 3-axis accelerometer, a 3-axis angular rate gyroscope, and/or a 2-axis inclinometer. The 3-axis accelerometer may provide signals indicative of the acceleration of machine 10 in an x, y, and z direction. The 3-axis angular rate gyroscope may provide signals indicative of the pitch rate, yaw rate, and roll rate of machine 10. In various embodiments, controller 40 may further process data generated by IMU 34 to estimate and/or determine the position of machine 10. For example, controller 40 may twice integrate the acceleration of machine 10 to obtain a position of machine 10 and/or integrate the angular rate of machine 10 to obtain an orientation of machine 10.

Object detection device 36 may include one or more devices that provide information corresponding to objects of worksite 12. For example, object detection device 36 may include a device that detects and ranges objects and/or other machine 22 surrounding machine 10. Object detection device 36 may include a LIDAR device, a radar device, a sonar device, a camera device, and/or other object detection devices. In various embodiments, object detection device 36 may emit a detection beam and receive the detection beam reflected off of an object, such as side wall 16, sign 18, barrel 19, post 20, other object 21, and/or other machine 22. Based on characteristics of the reflected beam, positioning system 30 may determine a distance and a direction from object detection device 36/machine 10 to the object with which the reflected beam interacted. By utilizing beams in a plurality of directions, object detection device 36 may generate a "picture" of the surroundings of machine 10. For example, when object detection device 36 includes a LIDAR device, which utilizes one or more laser beams, object detection device 36 may generate a map of points. Each point may correspond to an object on worksite 12 off of which a laser beam reflected. In some embodiments, object detection device 36 may determine other parameters in addition to the distance and direction to the detected object. For example, object detection device 36 may determine, based on characteristics of the reflected laser beam received by the LIDAR device, a measure of reflectivity associated with the detected object. In some embodiments, to facilitate detection, various objects of worksite 12 may be provided with marker 28, such as a reflective tape of a known reflectivity. This reflective tape may have a relatively high reflectivity compared to other objects found on worksite 12. In such a manner, object detection device 36 may be configured to selectively detect objects associated with the high reflectivity of the marker. In other embodiments, object detection device 36 may determine a shape and/or other optical characteristics associated with various objects of worksite 12. For example, object detection device 36 may include a camera device that obtains photos of various objects, which may be further processed by controller 40 for extraction of shapes and/or other characteristics.

Locating device 38 may include any device capable of providing a signal that indicates the location of machine 10. For example, locating device 38 may include a GPS device that receives or determines position information associated with machine 10. Position information may include a location of machine 10 as well as an orientation (heading) of machine 10. Additionally, locating device 38 may also provide an uncertainty measure associated with the position information. For example, in some situations, a GPS device may be capable of resolving the location of machine 10 within five centimeters. In other situations, such as when obstructions are present between the GPS device and GPS satellites, the GPS device may only be capable of resolving the location of machine 10 within one meter or more. The GPS device may provide this resolution information to positioning system 30.

Controller 40 may include a processor 42, a memory 44, and a secondary storage 46, and any other components for running an application. Processor 42 may include one or more known processing devices, such as a microprocessor. Memory 44 may include one or more storage devices configured to store information used by controller 40 to perform certain functions related to disclosed embodiments. Secondary storage 46 may include one or more volatile, non-volatile, magnetic, semiconductor, tape, optical, removable, nonremovable, and/or other type of storage devices or computer-readable mediums. Secondary storage 46 may store programs and/or other information, such as information related to processing data received from one or more sensors, as discussed in greater detail below. Controller 40 may be in communication with DMI 32, IMU 34, object detection device 36, and locating device 38. When processor 42 executes programs stored in secondary storage 46 and loaded into memory 44, controller 40 may process the signals received from DMI 32, IMU 34, object detection device 36, and/or locating device 38 and determine the position of machine 10 based on the processed signals.

In certain exemplary embodiments, controller 40 may utilize the received signals to determine the position of machine 10 using a process that, for purposes of this disclosure, is referred to as Perception Based Localization (PBL). PBL may include utilization of a Kalman filter, such as an extended Kalman filter, and/or a particle filter. A Kalman filter is a mathematical method that may be used to determine accurate values of measurements observed over time, such as measurements taken in a time series. The Kalman filter may include a prediction step and an update step. In a given timestep, the prediction step may include estimating an a priori value for a parameter of interest, for example, a location and/or orientation of machine 10, or locations of detected objects relative to machine 10. The a priori estimate may be based on several estimated values generated by the update step in a previous timestep as well as observed (measured) values of the given timestep. The update step of the given timestep may include estimating a refined a posteriori value for the parameter of interest based on an error between the a priori estimate and the observed value. The Kalman filter may also output estimation errors for both the a priori estimate and a posteriori estimate. An extended Kalman filter is a non-linear version of the Kalman filter described above, which is applicable to non-linear systems, such as the navigation of machine 10. The extended Kalman filter may include steps similar to those of a linear Kalman filter, and may also include calculations of linear approximations of the non-linear systems.

A particle filter is an estimation method that includes generating a plurality of particles in a map of worksite 12. Each particle may represent a hypothetical position of machine 10 within worksite 12. For each particle, the particle filter may determine a probability that the position of the particle matches the position of machine 10. The particle filter may determine this probability based on information about the surroundings of machine 10. Particles that are positioned such that their surroundings more closely match the surroundings of machine 10 are associated with a higher probability than particles that are positioned such that their surroundings less closely match the surroundings of machine 10. The particle filter may then iterate by regenerating a plurality of particles in the map of worksite 12, in part by resampling some of the particles from the previous iteration. Particles corresponding to higher probabilities are proportionally resampled more often than particles corresponding to lower probabilities. With each iteration, the particle filter may also update the position of the particles to reflect movement measurements of machine 10, obtained from DMI 32 and/or IMU 34, and assign new probabilities to the particles based on updated surroundings of the particles and machine 10 due to the movement of machine 10. The particle filter may determine an estimated position of machine 10 after several iterations, when most of the particles converge on one position within a predetermined threshold, for example.

Figure 3:
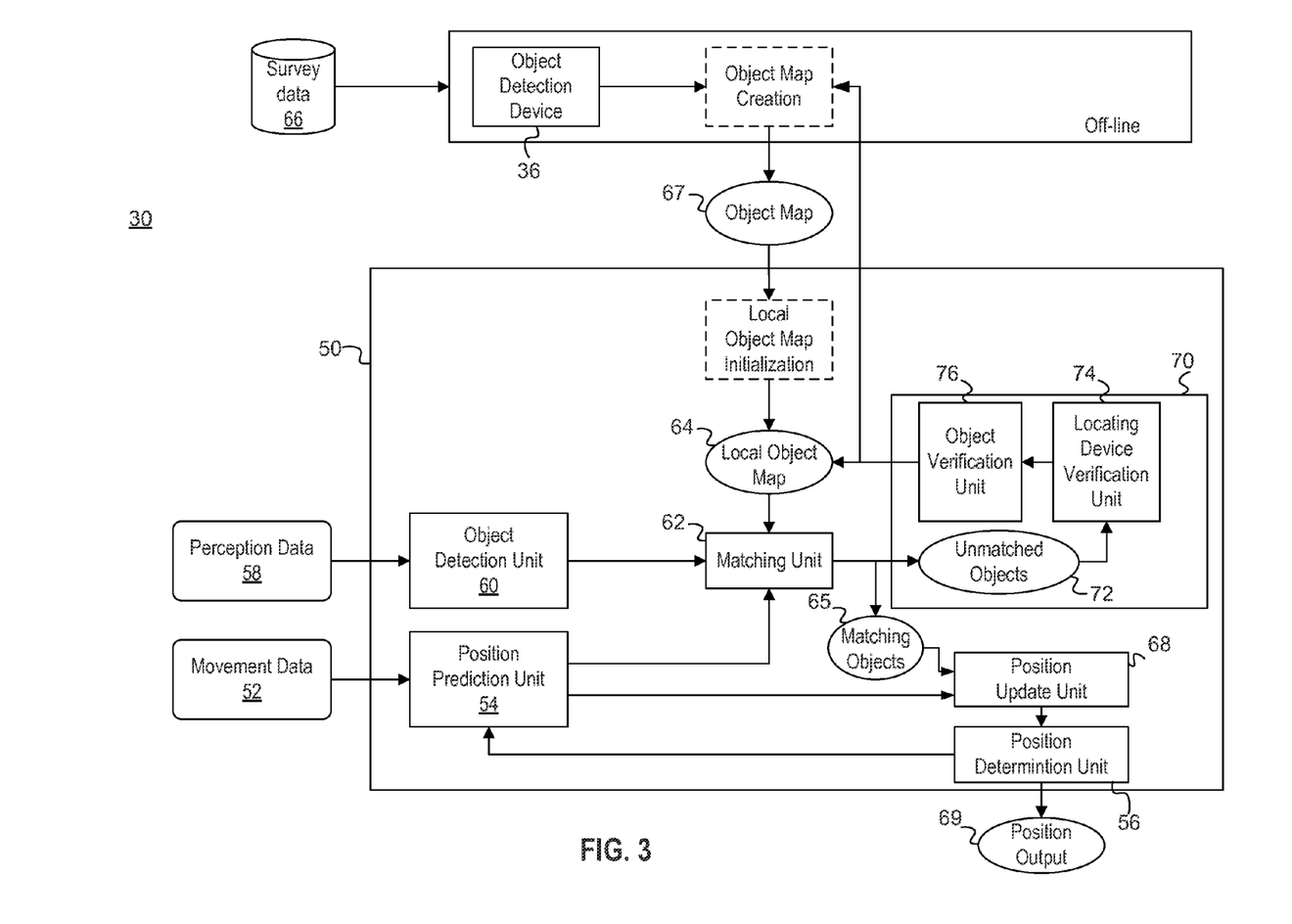
FIG. 3 is another block diagram of the exemplary disclosed positioning system of FIG. 2.

FIG. 3 illustrates an exemplary block diagram showing the data flow of an exemplary PBL unit 50 in positioning system 30, configured to process various data using PBL. PBL unit 50 may be implemented by controller 40, and more specifically processor 42, e.g., by executing one or more programs stored in secondary storage 46 and loaded into memory 44. For example, in certain embodiments, one or more of the units described below that are included in PBL unit 50 may be implemented as software code that is executed by processor 42 to perform the functions discussed below. Thus, while the embodiments discussed below describe the actions of individual units included in PBL unit 50, these functions may be performed by processor 42 of controller 40.

A position prediction unit 54 of PBL unit 50 may receive movement data 52 from DMI 32 and/or IMU 34 indicative of various movements of machine 10. Position prediction unit 54 may estimate a position of machine 10 based on movement data 52 and a previously estimated position of machine 10, generated by a position determination unit 56. For example, position prediction unit 54 may determine a change in orientation angle and/or a distance traveled based on movement data 52, and may then combine the previously estimated position with the change in position to generate a new estimated position. Position prediction unit 54 may continue to iteratively generate new estimated positions based on further movement data 52 as machine 10 operates and moves within worksite 12. In some embodiments, the new estimated positions may be generated at predetermined intervals, such as every hundredth of a second.

In the above example, the data generated by DMI 32 and/or IMU 34 may be associated with margins of errors due to noise, such as instrument noise and/or environmental noise. Moreover, with iterations of position prediction unit 54 updating the estimated position of machine 10 based on data from DMI 32 and/or IMU 34, an error in the estimated position may be compounded. In some circumstances, the error may compound to the extent that the estimated position of machine 10 no longer reasonably reflects the actual position of machine 10.

In certain embodiments, PBL unit 50 may generate another estimate of the position of machine 10 based on additional information, such as perception data 58. For example, based on perception data 58, PBL unit 50 may update the estimated position of machine 10 generated by position prediction unit 54 by utilizing position update unit 68. In various embodiments, position prediction unit 54 and position update unit 68 may together implement an extended Kalman filter and/or a particle filter. Position prediction unit 54 may generate an estimated position which corresponds to a prediction step, for example the prediction step of Kalman filters, and position update unit 68 may update the estimated position based on measured observations, i.e., perception data 58. The new estimated position generated by position update unit 68 may correct for errors that may have accumulated in the estimated position generated by position prediction unit 54.

To implement a Kalman filter, an extended Kalman filter, and/or particle filter, PBL unit 50 may receive perception data 58 from object detection device 36 indicative of objects on worksite 12. Object detection unit 60 may utilize perception data 58 from object detection device 36 to determine positions of detected objects relative to the position of object detection device 36/machine 10. Based on this information, object detection unit 60 may generate a map of detected objects. The map of detected objects may include multiple points, each representative of the positions of the various detected objects. Matching unit 62 may receive this map of detected objects and compare it with a map, such as local object map 64, which includes known objects of worksite 12. Local object map 64 may exemplarily be stored in secondary storage 46. Local object map 64 may be a preloaded map with a priori information about worksite 12, obtained separately from operation of machine 10 (off-line). For example, a machine and/or human may obtain survey data 66 of the geography of worksite 12 and store survey data 66 in a database. In some embodiments, a machine and/or human may obtain survey data 66 by using an object detection device 36 similar to the one machine 10 may be using. An object map 67 may then be created from survey data 66. In some embodiments, PBL unit 50 may initialize object map 67 and store object map 67 in secondary storage 46. In other embodiments, PBL unit 50 may initialize a portion of object map 67 as local object map 64, wherein local object map 64 corresponds to a specific area of worksite 12 in which machine 10 is operating. In yet other embodiments, instead of storing object map 67 or local object map 64 in secondary storage 46, PBL unit 50 may access an object map 67 or local object map 64 that is stored in a remote database or storage unit separate from machine 10 via a network.

Based on the comparison between the map of detected objects and local object map 64 (or object map 67), matching unit 62 may determine that some of the detected objects are matching objects 65 that match to known objects in local object map 64. In one embodiment, matching unit 62 may determine that a detected object matches to a known object when the location of the detected object is within a predetermined threshold of the location of the known object. For example, matching unit 62 may receive an estimated position of machine 10 from position prediction unit 54, and based on the estimated position of machine 10, matching unit 62 may estimate positions of the detected objects by using the relative positions of the detected objects to machine 10, obtained from object detection device 36. Matching unit 62 may then determine that some of the detected objects match known objects in local object map 64 when the estimated positions of the detected objects correspond to the positions of the known objects within a predetermined threshold. In another embodiment, matching unit 62 may determine that a detected object matches a known object when the size, shape, reflectivity and/or other attributes of the detected object corresponds to the size, shape, reflectivity, and/or other attributes of the known object. Each matching object 65 may be associated with information related to its position relative to machine 10 as detected by object detection device 36.

Position update unit 68 may update the estimated position generated by position prediction unit 54 based on matching objects 65. In some embodiments that utilize an extended Kalman filter to generate the updated estimated position, the estimated position generated by position prediction unit 54 may be utilized as the a priori estimate of the position of machine 10, which corresponds to the prediction step of the extended Kalman filter. Position update unit 68 may utilize this a priori estimated position of machine 10 to determine a corresponding estimate of the positions of objects surrounding machine 10. For example, position update unit 68 may determine estimated positions of the objects by referencing local object map 64 (or object map 67). In this example, position update unit 68 may identify known objects stored in the map in the vicinity of the a priori estimated position. Position update unit 68 may determine the position of these identified known objects relative to the a priori estimated position as stored in the map. Position update unit 68 may then compare the relative positions of the known objects to measurements of the relative position of matching objects 65 in relation to machine 10 as detected by object detection device 36. Based on errors between the relative positions of known objects surrounding the a priori estimated position and the measured relative positions of matching objects 65 surrounding machine 10, position update unit 68 may generate a refined a posteriori estimated position of machine 10. Position update unit 68 may generate the refined a posteriori estimated position of machine 10 by utilizing the update step of the extended Kalman filter.

In other embodiments, in which position update unit 68 utilizes a particle filter to generate the updated estimated position, the estimated position generated by position prediction unit 54 may be utilized to randomly generate a plurality of hypothetical particles. For example, in some embodiments, position update unit 68 may randomly populate with particles an area of a map of worksite 12 that is within a predetermined radius of the estimated position generated by position prediction unit 54. Furthermore, in some embodiments, the particles may be distributed within an area based on a noise modeling of the sensors and other components of positioning system 30, e.g., DMI 32, IMU 34, and/or object detection device 36. Position update unit 68 may evaluate the particles based on observed data, e.g., matching objects 65 as detected by object detection device 36. For example, position update unit 68 may evaluate a particle by comparing known objects surrounding the particle, as stored in local object map, to the detected matching objects 65 surrounding machine 10. Particles with known objects surrounding the particle that correspond closely to matching objects 65 may be evaluated as having a higher probability of corresponding to the actual position of machine 10 than particles with surrounding known objects that do not correspond closely to matching objects 65. Based on the evaluation, position update unit 68 may assign weights to the particles and selectively keep particles based on the assigned weights. Position update unit 68 may utilize the selected particles to update the estimated position generated by position prediction unit 54. For example, position update unit 68 may average the position of the selected particles to obtain the updated estimated position of machine 10. Furthermore, this updated estimated position generated by utilizing the particle filter method may be used in the next iteration performed by position prediction unit 54 for generating an estimated position of machine 10.

Position determination unit 56 may receive the estimated positions generated by position prediction unit 54 and position update unit 68 and output a position 69 of machine 10 based on those estimated positions. In general, position prediction unit 54 and position update unit 68 do not have to be synchronized. In some embodiments, position prediction unit 54 may generate estimated positions more frequently than position update unit 68 generates updates of the estimated positions. For example, this may be due to the fact that movement data 52 from DMI 32 and/or IMU 34 can be obtained and processed more quickly than perception data 58 from object detection device 36. In some embodiments, position determination unit 56 may determine position 69 of machine 10 based on one of either the estimated position from position prediction unit 54 or the updated estimated position from position update unit 68, depending on whether position prediction unit 54 or position update unit 68 has most recently generated an estimated position of machine 10. In such embodiments, position determination unit 56 may determine and output position 69 more frequently based on the estimated position from position prediction unit 54, while determining the output position 69 less frequently based on the updated estimated position from position update unit 68. In some embodiments, because position determination unit 56 may, for example, output position 69 based on position prediction unit 54 at a frequency of a hundred times per second and output position 69 based on position update unit 68 at a frequency of ten times per second, the error in output position 69 may be bounded. That is, for every tenth of a second, position prediction unit 54 may generate ten estimated positions based on DMI 32 and/or IMU 34. By the tenth estimated position, the error in the estimated position may have compounded to be more than half a meter, for example. However, position update unit 68 may then generate an updated estimated position which corrects for the errors generated by position prediction unit 54. Furthermore, position update unit 68 may generate an estimated position that has a maximum error of thirty centimeters, for example. Therefore, when position determination unit 56 utilizes the updated estimated position from position update unit 68 to determine output position 69, the error in output position 69 is reset to be no greater than thirty centimeters. The error values presented are exemplary only, and are not intended to be limiting.

In other embodiments, position determination unit 56 may average the estimated position from position prediction unit 54 and position update unit 68 to determine output position 69. For example, if each estimated position is given by an x-coordinate, a y-coordinate, and an orientation angle, position prediction unit 54 may sum the x-coordinates from both of the estimated positions and divide by two to obtain an averaged x-coordinate, and likewise for the y-coordinate and the orientation angle. In another example, position determination unit 56 may receive a measure of confidence for each of the estimated positions, and utilize the estimated position associated with a greater confidence level. In a further example, position determination unit 56 may take a weighted average of the estimated positions based on the confidence measure for each of the estimated positions.

In further embodiments, a map enhancing unit 70 of PBL unit 50 may enhance local object map 64 and/or object map 67, to include detected objects that do not match to known objects in either of the maps. For example, map enhancing unit 70 may receive one or more unmatched objects 72 from matching unit 62. Unmatched object 72 may be the detected object that matching unit 62 determined did not match a known object in local object map 64. Based on the position of machine 10 and the positions of unmatched object 72 relative to machine 10, map enhancing unit 70 may determine the positions of unmatched object 72 and add unmatched object 72 to local object map 64 and/or object map 67. In some embodiments, map enhancing unit 70 may add unmatched object 72 to local object map 64 and/or object map 67 only when a locating device verification unit 74 determines that positioning system 30 is accurately determining the position of machine 10. Otherwise, if a map included unmatched objects 72 with significant margins of error, PBL unit 50 may not function properly. In general, a position may be determined to be "accurate" based on a standard considered by the operator to denote a usable and/or reliable position. In one example, positioning system 30 may be accurately determining the position of machine 10 when the resolution of a GPS device as locating device 38 is within a predefined range and/or threshold. In another example, positioning system 30 may be accurately determining the position of machine 10 when a confidence level associated with position 69 output by position determination unit 56 exceeds a threshold. In some embodiments, map enhancing unit 70 may add unmatched object 72 to local object map 64 and/or object map 67 only when an object verification unit 76 determines that unmatched object 72 should be added to local object map 64 and/or object map 67, as further discussed below.

Figure 4:
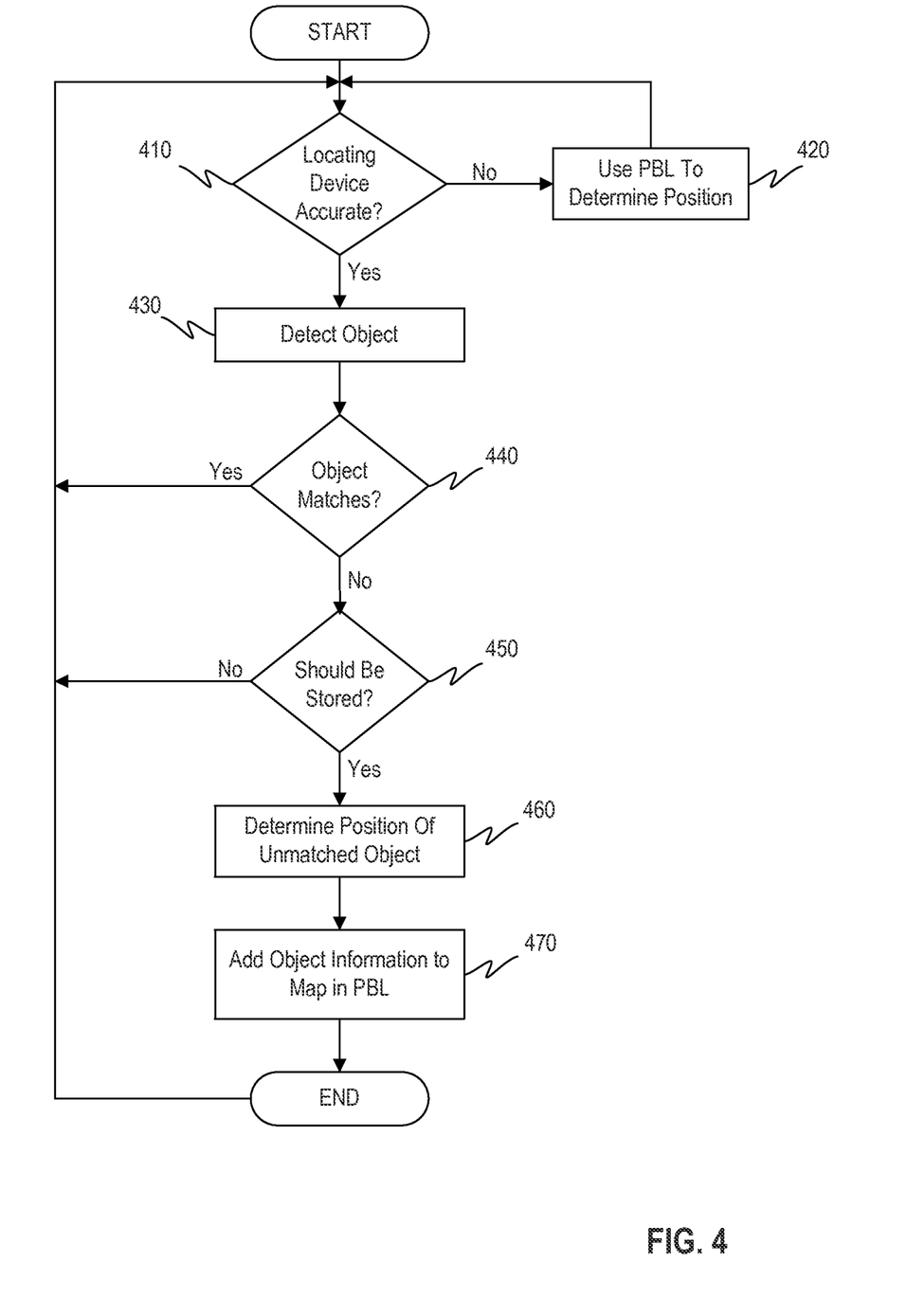
FIG. 4 is a flowchart depicting an exemplary disclosed method performed by the exemplary disclosed positioning system of FIGS. 2 and 3.

FIG. 4 illustrates a flow chart depicting an exemplary method used for determining a position of machine 10 using enhanced perception-based localization. FIG. 4 will be discussed in the following section to further illustrate the disclosed positioning system and its operation.

INDUSTRIAL APPLICABILITY

The disclosed positioning system 30 may be applicable to any machine, such as machine 10, where position determination is desired. The disclosed positioning system 30 may provide for this need through the use of methods described herein, which may be performed by controller 40. Operation of positioning system 30 will now be explained with respect to FIG. 4.

In various embodiments, positioning system 30 may determine the position of machine 10 by utilizing independent determination and/or estimation of the position by various components of positioning system 30. For example, in one embodiment, positioning system 30 may utilize locating device 38 to determine the position of machine 10. However, positioning system 30 may utilize locating device 38 to determine the position of machine 10 only when locating device 38 is accurately providing the position of machine 10. For example, at Step 410, positioning system 30 may check to see if locating device 38 is accurately providing the position of machine 10. In some embodiments, positioning system 30 may determine whether an uncertainty measure associated with the position information provided by locating device 38 exceeds a threshold and/or is within a tolerance range by utilizing locating device verification unit 74. For example, locating device verification unit 74 may determine whether a GPS device associated with machine 10 is providing the position of machine 10 within a predetermined threshold, such as five centimeters and/or one degree. The accuracy requirement of five centimeters and/or one degree is exemplary only, and the requirement may be more or less than five centimeters and/or one degree. Locating device verification unit 74 may determine that the GPS device is providing the position within a threshold by utilizing the resolution information provided by the GPS device. In another embodiment, positioning system 30 may determine whether a confidence level of position 69 output by position determination unit 56 exceeds a threshold.

When positioning system 30 determines that locating device 38 is not accurately providing the position of machine 10 (Step 410, No), positioning system 30 may utilize another component of positioning system 30 to determine the position of machine 10. For example, at Step 420, positioning system 30 may utilize PBL unit 50 to determine the position of machine 10. PBL unit 50 enables positioning system 30 to continue determining the position of machine 10 despite the lack of an accurate signal from locating device 38.

In various embodiments, positioning system 30 may continue to check whether locating device 38 is accurately providing the position of machine 10 and switch between utilizing locating device 38 and PBL unit 50 based on the result of the check. For example, positioning system 30 may predominantly rely on locating device 38 to determine the position of machine 10, and only utilize PBL unit 50 as a backup when locating device 38 is not providing an accurate position. In another example, positioning system 30 may predominantly rely on PBL unit 50 to determine the position of machine 10, and only utilize locating device 38 as a backup when PBL unit 50 is not providing an accurate position.

When positioning system 30 determines that locating device 38 is accurately providing the position of machine 10 (Step 410, Yes), positioning system 30 may perform steps to enhance the local object map 64 utilized by PBL unit 50. For example, at Step 430, positioning system 30 may utilize object detection device 36 and object detection unit 60 to detect objects surrounding machine 10. At Step 440, positioning system 30 may then determine whether the detected object matches one of the known objects in a map, such as local object map 64 and/or object map 67, by utilizing matching unit 62. When positioning system 30 determines that the detected object matches one of the known objects in the map (Step 440, Yes), positioning system 30 may return to other processes of position determination as described above. For example, positioning system 30 may utilize the matching object 65 to determine an estimated position by utilizing position update unit 68. When positioning system 30 determines that the detected object does not match one of the known objects in the map (Step 440, No), positioning system 30 may continue the process of enhancing the map.

For example, at Step 450, positioning system 30 may utilize object verification unit 76 to determine whether unmatched object 72 should be added to and stored in the map of worksite 12 for use in positioning machine 10. Unmatched object 72 may include any object that is present on worksite 12. Some of these objects may be useful for positioning system 30 to utilize in positioning machine 10, while other objects may be less useful for positioning system 30 to utilize. Positioning system 30 may determine whether unmatched object 72 includes a useful object for positioning machine 10 based on any of a number of criteria as further discussed below.

In some embodiments, object verification unit 76 may determine that unmatched object 72 should be added to the map when the reflectivity of unmatched object 72, or a portion of unmatched object 72, as measured by object detection device 36, exceeds a predetermined threshold. For example, object verification unit 76 may determine that the reflectivity of unmatched object 72 exceeds a predetermined threshold when an intensity of one or more laser beams reflected by unmatched object 72 and detected by object detection device 36, exceeds a threshold. In some situations, unmatched object 72 may be an object such as sign 18 with a surface that is highly reflective. In general, signs 18 may be permanent or semi-permanent stationary objects, with fixed and defined positions associated with them. Object verification unit 76 may therefore be configured to classify objects with the high reflectivity of sign 18 as objects that should be added to the map of worksite 12 because they serve as reliable references of position in worksite 12. In other situations, when unmatched object 72 is not characteristically reflective, such as a plastic barrel 19, the object may have reflective markers 28, such as reflective tape and/or reflectors, affixed to it. In some embodiments, markers 28 affixed to an object on worksite 12 may be an indication that a human worker at worksite 12 has determined that the object should be added to the map of worksite 12 because the object is a reliable reference of position. Therefore, when object verification unit 76 determines an unmatched object 72 has an associated reflectivity indicative of marker 28, object verification unit 76 may classify that such unmatched object 72 should be added to the map.

In other embodiments, markers 28 affixed to an object on worksite 12 may be an indication that unmatched object 72 should be added to the map of worksite 12 because machine 10 should be operated with caution in the vicinity of such object. For example, marker 28 may be affixed to power cable 24, such that object detection device 36 detects power cable 24. However, because power cable 24 is generally not a stationary object, object verification unit 76 may determine that the detected power cable 24 should not be added to the map. In other embodiments, object verification unit 76 may determine that power cable 24 should not be added to the map based on the shape of power cable 24, as discussed in greater detail below.

Object verification unit 76 may determine whether unmatched object 72 should be stored in the map of worksite 12 based on the shapes associated with unmatched object 72. For example, object detection device 36 may include a camera that captures a still image or a video image of unmatched object 72. Object verification unit 76 may extract the dimensions, shape, aspect ratio, color, and/or any other physical characteristics associated with unmatched object 72 from the captured image, and compare the extracted characteristics to a database of objects. For example, object verification unit 76 may extract a certain shape with certain dimensions associated with unmatched object 72 on worksite 12. Object verification unit 76 may then identify that the certain shape and certain dimensions corresponds to a particular type of road sign 18 by utilizing the database of objects. Object verification unit 76 may then be configured to determine that unmatched object 72 with shape and dimensions corresponding to sign 18 should be added to the map of worksite 12. In another example, object verification unit 76 may extract a shape and/or dimensions associated with unmatched object 72 and utilize the database of objects to determine that the unmatched object 72 is other machine 22, such as a bulldozer. Because other machine 22 may be mobile about worksite 12, object verification unit 76 may determine that unmatched object 72 should not be added to the map of worksite 12 because it does not provide a reliable landmark of a specific location. In yet another example, object verification unit 76 may detect that an extracted shape and/or dimension of unmatched object 72 corresponds with power cable 24. Because power cable 24 is usually not fixed in a permanent position as it is dragged along the ground based on the machine it is providing power to, object verification unit 76 may determine that unmatched object 72 should not be added to the map.

In another embodiment, markers 28 may be affixed to objects that define the perimeter of a specific area 29 within worksite 12. For example, posts 20 may be affixed with markers 28, such that object verification unit 76 determines that posts 20 should be added to the map of worksite 12. Once posts 20 are included in the map of worksite 12, positioning system 30 may utilize the positions of posts 20 as indicators of a boundary for specific area 29. In some embodiments, specific area 29 may be designated as an exclusion zone. Exclusion zones are not limited to being defined by posts 20 provided markers 28. For example, exclusion zones may be designated by a set of coordinates stored in memory 44 and/or secondary storage 46 of controller 40, which define the corners of the exclusion zone. In various embodiments, when object verification unit 76 determines that unmatched object 72 is located in an exclusion zone, object verification unit 76 may determine that unmatched object 72 should not be added to the map of worksite 12. Exclusion zones may therefore be set up to be specific areas 29 of worksite 12 in which it may be undesirable to include objects to the map. As an example, there may be a specific area 29 of worksite 12, in which a high level of work activity is occurring. In such area, the objects may be frequently changing positions and/or dimensions. For example, equipment, building materials, piles of earth or rock, and/or debris may be frequently moved around, brought in, and/or taken away as needed. Furthermore, piles of earth or rock may grow bigger, shrink, or disappear, depending on the work tasks being performed. Because of the frequent changes and variability over time in specific area 29, it may be not be suitable to utilize objects in specific area 29 as reliable landmarks of position.

Alternatively, object verification unit 76 may transmit information about unmatched object 72 to a user display, via wired and/or wireless connections, and request confirmation by a user as to whether unmatched object 72 should be stored in the map of worksite 12. Information transmitted about unmatched object 72 may include information about the shape, dimension, color, aspect ratio, and/or any other physical characteristics extracted from the data obtained by object detection device 36. Alternatively, information transmitted about unmatched object 72 may be the image and/or video captured by a camera included in object detection device 36. In some embodiments, the user display may be part of a remotely located operating station where a human operator may receive the information about unmatched object 72 and input a command as to whether unmatched object 72 should be added to the map. In other embodiments, the user display may be part of a handheld device being operated by a human operator onsite or offsite. Based on the command input by the human operation, unmatched object 72 may be added to the map of worksite 12. For example, object verification unit 76 may transmit information about unmatched object 72 to the remotely located operating station where a human operator may input the command that unmatched object 72 should be added to the map. A signal indicating that unmatched object 72 should be added may be transmitted from the remotely located operating station back to object verification unit 76. Object verification unit 76 may receive the signal and add unmatched object 72 to the local object map 64. In addition, a signal may be transmitted from the remotely located operation station to a remotely located database and unmatched object 72 may be added to object map 67.

In yet another embodiment, object verification unit 76 may determine whether unmatched object 72 is stationary or mobile, and add unmatched object 72 to the map based on this determination. In some embodiments, object verification unit 76 may determine whether unmatched object 72 is mobile based on whether unmatched object 72 is associated with a GPS signal. For example, object verification unit 76 may determine the position of unmatched object 72 and transmit a query that includes this position to a remotely located database server, or any other computing system associated with worksite 12, which is tracking the position of machine 10 and other machines 22 on worksite 12 via GPS devices located on these machines. Object verification unit 76 may subsequently receive a signal from the database server indicative of whether the position of unmatched object 72 corresponds with the current position of one of other machines 22, as indicated by the GPS signal of other machine 22. If the position of unmatched object 72 corresponds with that of other machine 22, object verification unit 76 may determine that unmatched object 72 should not be added to the map, since other machine 22 may be mobile and frequently changing position. In another example, other machine 22 may be mobile but in certain situations may have a semi-permanent position over a duration of time. For example, other machine 22 may be the electric shovel in FIG. 1, which may be stationed at a particular location on worksite 12 for several months to perform operations exclusively at that location. Because such other machine 22 has a fixed position for some period of time, other machine 22 may be used as a reliable landmark of position despite being a mobile machine. Such other machine 22 may be tagged in the remotely located server database as being currently in a stationary condition. Therefore, object verification unit 76 may receive information indicative of the stationary condition of other machine 22 and add other machine 22 to the map, despite other machine 22 being generally a mobile machine.

In yet another embodiment, object verification unit 76 may determine whether unmatched object 72 should be added to the map by determining whether unmatched object 72 has been detected by a plurality of machines 10/22. For example, when machine 10 detects unmatched object 72, object verification unit 76 may transmit the information to the remote database server, or any other computer system associated with worksite 12, which may transmit a signal to other machine 22 to navigate towards the vicinity of the same unmatched object 72. Other machine 22 may also detect the same unmatched object 72, and unmatched object 72 may therefore be verified as a stationary object. In other situations, other machine 22 may not be able to detect the same unmatched object 72, which may indicate that unmatched object 72 is not stationary and has moved to a different position. In another example, machine 10 may detect unmatched object 72 and transmit a signal indicative of such detection to the remote database server, which may store the information that unmatched object 72 has been detected. Other machine 22 may also detect the same unmatched object 72 at the same position and transmit a signal indicative of such detection to the remote database server.

After unmatched object 72 has been detected a certain number of times, for example a number that exceeds a predetermined threshold, unmatched object 72 may be determined to be an object that should be added to the map of worksite 12. For example, the remote database server may make this determination and store the unmatched object 72 in object map 67 and/or transmit a signal to object verification unit 76 indicating that unmatched object 72 should be stored in local object map 64. In another example, object verification unit 76 may receive the number of times that unmatched object 72 has been detected from the remote database server, and object verification unit 76 may make the determination whether unmatched object 72 should be stored in local object map 64. In a further embodiment, the number of times unmatched object 72 is detected may be used to assign a confidence level associated with the object when it is stored in the map of worksite 12. For example, objects that have been detected multiple times may be assigned a greater confidence level than objects that have been detected only once. Each of the multiple detections may serve as confirmation of the presence and position of the object, thereby increasing the likelihood that the object is a reliable landmark of position.

In other embodiments, unmatched object 72 may be assigned a confidence level based on the data obtained from object detection device 36. For example, if the dimensions and/or shape of unmatched object 72 correspond to only one specific object stored in the database of objects, object verification unit 76 may assign a high confidence level to unmatched object 72. If the dimensions and/or shape of unmatched object 72 potentially corresponds to multiple objects stored in the database of objects, such that unmatched object 72 cannot be confidently identified, object verification unit 76 may assign a low confidence level.

Object verification unit 76 may determine whether unmatched object 72 should be added to the map based on whether assigned confidence level exceeds a predetermined threshold, for example. In various embodiments, positioning system 30 may selectively utilize objects stored in the map of worksite 12 with a confidence level that exceeds a predetermined threshold to determine the position of machine 10. The various embodiments of determining whether unmatched objects 72 should be added to one or more maps of worksite 12 by object verification unit 76 are exemplary only, and not meant to be limiting. For example, object verification unit 76 may perform various combinations of the alternatives and embodiments as discussed.

When positioning system 30 determines that unmatched object 72 should not be stored in local object map 64 (Step 450, No), positioning system 30 may return to other processes of position determination as described above. When positioning system 30 determines that unmatched object 72 should be stored in local object map 64 (Step 450, Yes), positioning system 30 may determine the position of unmatched object 72 at Step 460. For example, positioning system 30 may obtain an accurate position of machine 10, for example, from locating device 38 and/or PBL unit 50, and a position of unmatched object 72 relative to machine 10, for example, from object detection unit 60. Based on this information, positioning system 30 may determine the position of unmatched object 72.

Steps 450 to 470 may be iterated for each of unmatched objects 72 determined by matching unit 62. Steps 410 to 470 may be iterated at predetermined intervals, for example, on the order of ten or one hundred times a second. In other embodiments, positioning system 30 may perform Steps 410 to 470 more or less than tens or hundreds of times a second.

By enhancing local object map 64, machine 10 may be capable of knowing its position when traversing areas of worksite 12 that may not originally have been a part of object map 67. Furthermore, machine 10 may be capable of knowing its position as it traverses areas of worksite 12 that additionally may not have reliable GPS signals. Positioning system 30 may stop execution of Steps 410 to 470 when position determination is no longer needed and/or wanted. For example, positioning system 30 may stop the execution of Steps 410 to 470 when machine 10 is turned off and/or when the operator of machine 10 manually inputs a signal that commands positioning system 30 to stop determining the position of machine 10.

It will be apparent to those skilled in the art that various modifications and variations can be made to the disclosed positioning system. Other embodiments will be apparent to those skilled in the art from consideration of the specification and practice of the disclosed positioning system. It is intended that the specification and examples be considered as exemplary only, with a true scope being indicated by the following claims and their equivalents.

The invention claimed is:

1. A computer-implemented method for determining a position of a machine on a worksite, comprising:
   storing a map of the worksite which includes one or more known objects in the worksite;
   determining, by a processor, whether a locating device associated with the machine is accurately providing the position of the machine;
   detecting one or more objects in the worksite;
   determining, by the processor, an unmatched object from among the detected objects that does not match the one or more known objects stored in the map;
   storing the unmatched object in the map as a known object of the worksite, responsive to determining that the locating device is accurately providing the position of the machine; and
   verifying whether the unmatched object should be stored in the map based on a characteristic of the object, before storing the unmatched object, wherein verifying whether the unmatched object should be stored in the map includes:
   determining whether the unmatched object is stationary or mobile; and
   determining that the unmatched object should not be stored in the map when the unmatched object is determined to be mobile.

2. The method of claim 1, further including:
   responsive to determining that the locating device associated with the machine is not accurately providing the position of the machine, determining the position of the machine by:
   a prediction step, the prediction step including:
      detecting a movement of the machine, and
      estimating the position of the machine based on the detected movement of the machine and a previous determined position of the machine; and
   an update step, the update step including:
      detecting the one or more objects in the worksite, and
      determining one or more matching objects from among the detected objects that match the one or more known objects stored in the map.

3. The method of claim 2, wherein:
   the prediction step and the update step are part of a Kalman filter, an extended Kalman filter, or a particle filter.

4. The method of claim 1, wherein verifying whether the unmatched object should be stored in the map includes:
   generating a laser beam and directing the laser beam at the unmatched object;
   receiving the laser beam reflected off the unmatched object; and
   determining that the unmatched object should be stored in the map when an intensity of the laser beam reflected off the unmatched object exceeds a threshold.

5. The method of claim 1, wherein:
   the unmatched object is determined to be mobile if the unmatched object is associated with another locating device.

6. The method of claim 1, wherein verifying whether the unmatched object should be stored in the map includes:
   detecting the unmatched object by a first machine in the worksite;
   detecting the unmatched object by a second machine in the worksite;
   determining that the unmatched object should be stored in the map when a number of first and second machines that have detected the unmatched object exceeds a predetermined threshold.

7. The method of claim 1, wherein verifying whether the unmatched object should be stored in the map includes:
   displaying the unmatched object with the map on a user display; and requesting confirmation by a user as to whether the unmatched object should be stored in the map.

8. The method of claim 1, wherein verifying whether the unmatched object should be stored in the map includes:
   determining whether the unmatched object is located in an exclusion zone; and
   determining the unmatched object should not be stored in the map when the unmatched object is located in the exclusion zone.

9. The method of claim 1, wherein verifying whether the unmatched object should be stored in the map includes:
   determining a confidence level associated with the unmatched object; and
   determining that the unmatched object should be added to the map when the confidence level exceeds a predetermined threshold.

10. The method of claim 1, wherein verifying whether the unmatched object should be stored in the map includes:
    comparing a shape of the unmatched object with known shapes in a database; and
    determining whether the unmatched object should or should not be stored in the map based on the comparison of the shape of the unmatched object with the known shapes in the database.

11. A position determination control system for determining a position of a machine on a worksite, comprising:
    one or more memories storing instructions and a map of the worksite which includes one or more known objects in the worksite; and
    one or more processors configured to execute the instructions to perform operations, including:
      determining whether a locating device associated with the machine is accurately providing the position of the machine;
      detecting one or more objects in the worksite;
      determining an unmatched object from among the detected objects that does not match the one or more known objects;
      storing the unmatched object in the map as a known object of the worksite, responsive to determining that the locating device is accurately providing the position of the machine; and
      verifying whether the unmatched object should be stored in the map based on a characteristic of the object, before storing the unmatched object, wherein verifying whether the unmatched object should be stored in the map includes:
        determining whether the unmatched object is stationary or mobile; and
        determining that the unmatched object should not be stored in the map when the unmatched object is determined to be mobile.

12. The control system of claim 11, wherein the one or more processors are further configured to execute the instructions to perform:
    responsive to determining that the locating device associated with the machine is not accurately providing the position of the machine, determining the position of the machine by:
    a prediction step, the prediction step including:
      detecting a movement of the machine, and
      estimating the position of the machine based on the detected movement of the machine and a previous determined position of the machine; and
    an update step, the update step including:
      detecting the one or more objects in the worksite, and
      determining one or more matching objects from among the detected objects that match the one or more known objects stored in the map.

13. A system for determining a position of a machine on a worksite, comprising:
    one or more memory storage devices for storing a map of the worksite comprising one or more known objects in the worksite and positions of the one or more known objects;
    a GPS device associated with the machine;
    a movement sensor associated with the machine for detecting one or more movements of the machine;
    an object detection sensor associated with the machine for detecting one or more objects in the worksite; and
    a controller in communication with the one or more memory storage devices, the GPS device, the movement sensor, and the object detection sensor, configured to:
      determine whether the GPS device associated with the machine is accurately providing the position of the machine;
      determine an unmatched object from among the detected one or more objects that does not match the one or more known objects stored in the map;
      store the unmatched object in the map as a known object of the worksite, responsive to determining that the GPS device is accurately providing the position of the machine; and
      verify whether the unmatched object should be stored in the map based on a characteristic of the object, before storing the unmatched object, wherein verifying includes:
        communicating with a remote database server to determine whether the unmatched object is associated with its own GPS device; and
        determining that the unmatched object should not be stored in the map when the unmatched object is associated with its own GPS device.

14. The system of claim 13, wherein the controller is further configured to:
    store the unmatched object in the map only when the GPS device associated with the machine is accurately providing the position of the machine; and
    responsive to determining that the GPS device associated with the machine is not accurately providing the position of the machine, determine the position of the machine by:
    a prediction step, the prediction step including:
      estimating the position of the machine based on the detected one or more movements of the machine and a previous determined position of the machine; and
    an update step, the update step including:
      determining one or more matching objects from among the detected one or more objects that match the one or more known objects stored in the map.

15. The system of claim 14, wherein:
    the object detection sensor includes a LIDAR unit configured to generate a laser beam directed at the one or more objects and receive the laser beam reflected off of the one or more objects; and
    wherein verifying includes:
      determining whether the unmatched object should be stored in the map;
      determining that the unmatched object should be stored in the map when an intensity of the laser beam reflected off of the one or more objects exceeds a threshold.

16. The system of claim 14, wherein
the object detection sensor includes an optical camera configured for receiving optical information of the one or more objects indicative of a shape of the one or more objects; and wherein verifying includes:
  comparing the shape of the unmatched object with known shapes in a database, and
  determining whether the unmatched object should be stored in the map based on the comparison of the shape of the unmatched object with the known shapes in the database.

\* \* \* \* \*